Inventors
Herman Epstein
Edward M. Johnson
Peter J. Loftus

By James J. Jennings, Jr.
Attorney

LEFT ERROR

WEB CENTERED

RIGHT ERROR

Inventors
Herman Epstein
Edward M. Johnson
Peter J. Loftus

By James J. Jenninger Jr.
Attorney

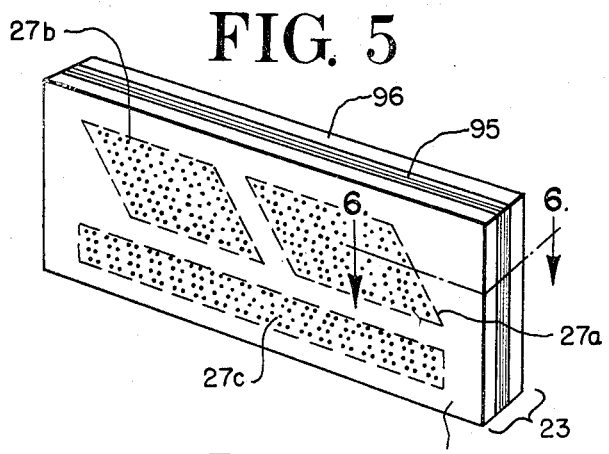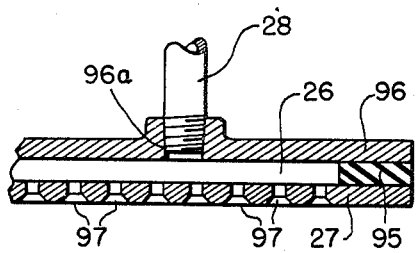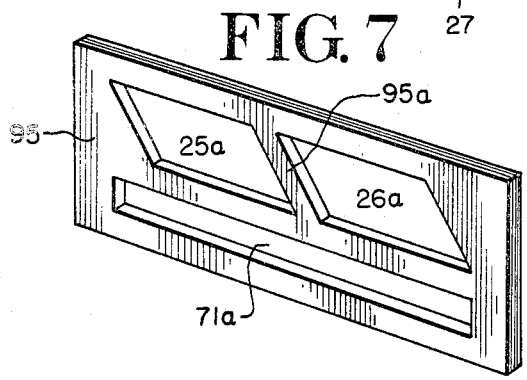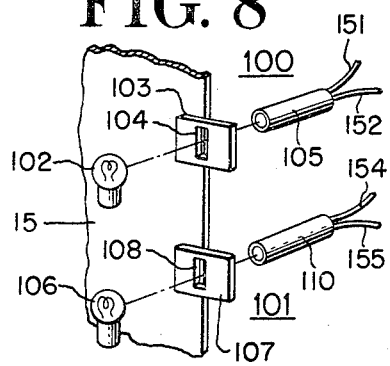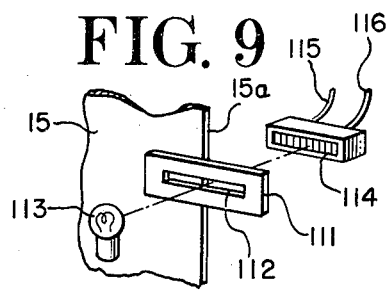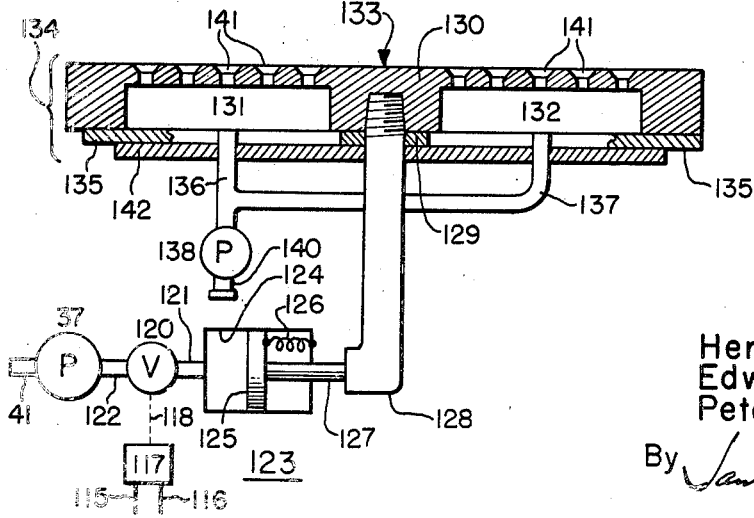
Inventors
Herman Epstein
Edward M. Johnson
Peter J. Loftus

United States Patent Office 3,489,325
Patented Jan. 13, 1970

3,489,325
CONTROL SYSTEM WITH MULTICHAMBER VACUUM UNIT FOR REGULATING LATERAL WEB ALIGNMENT
Herman Epstein, Melrose Park, Edward M. Johnson, Glenside, and Peter J. Loftus, Levittown, Pa., assignors to Borg-Warner Corporation, Chicago, Ill., a corporation of Illinois
Filed Oct. 25, 1967, Ser. No. 678,058
Int. Cl. B65h *25/06, 25/08, 25/26*
U.S. Cl. 226—15
10 Claims

ABSTRACT OF THE DISCLOSURE

When a longitudinally displaced web 15 is inadvertently misaligned laterally, a sensing unit 31 produces control signals indicative of the direction of lateral misalignment. A vacuum unit 23 with a foraminous area 27 on the surface adjacent the web has a hollow interior divided into at least two chambers 25 and 26. A pump 37 evacuates air at a given rate from each chamber and these rates are adjusted relative to each other by a pair of valves 35 and 36, controlled as a function of the lateral misalignment indicated by the control signals. Variation of the air evacuation rates varies the tension levels between the web and the different foraminous segments 27a and 27b which communicate with the chambers 25, 26. This regulation of the tension levels in turn corrects the lateral misalignment and maintains the web on the predetermined path.

Background of the invention

The higher the longitudinal displacement rate of any web, whether cloth, fabric, metal or other substance, the more complex does the problem of maintaining precise lateral web alignment become. Many different proposals have been put forward for sensing the lateral web deviations and for correcting the direction of web travel. Some of the proposed solutions have utilized a vacuum box or vacuum unit with a formainous plate covering a portion of the chamber which is evacuated, so that air moving through these apertures tends to secure the web against the plate. Patent No. 2,994,489 describes such an elementary arrangement and later-issued Patent No. 3,032,-245, describes a refinement of this elementary system in which the level of the vacuum is changed to vary the tension level uniformly across the entire foraminous area. There has remained in this complex art a need for an accurate, positive acting and inexpensive control system which effects precision lateral alignment without the necessity of physical displacement of a guide shaft, canting of guide rollers to change the web path, and similarly cumbersome lateral web alignment arrangements which have been described in the prior art teachings. It is toward the fulfillment of this need that the present invention is directed.

Summary of this invention

The present invention finds particular utility in a drive arrangement for longitudinally displacing a web along a predetermined path where the maintainance of precise lateral web alignment is important. By way of example in an electrostatic printing system where information is initially represented by deposition of charged particles on small, discrete areas of the web, and thereafter the charged areas are inked or developed and then fixed to provide a visible record of the information, correct lateral web placement is requisite to insure a uniform presentation along the web.

In a preferred embodiment the control system of this invention comprises a vacuum unit having one surface disposed adjacent the predetermined web path, which surface includes a foraminous area extending over at least a portion of the surface, with cooperating wall portions of the unit defining a hollow interior behind the foraminous area. Divider means positioned within the vacuum unit effectively separates the hollow interior into at least two chambers behind the one surface, and each chamber is in communication with a segment of the foraminous area. Means is connected to evacuate air from the chambers and thus provide tension between the web and the foraminous area segments. Means is positioned to sense lateral movement of the web with respect to the predetermined web path, and to provide a control signal denoting the direction of any lateral deviation from such path. A control unit is connected for operation, in response to receipt of the control signal, to vary the tension level between the web and one of the foraminous segments relative to the tension level between the web and the other foraminous segment. The web tends to be laterally displaced toward the lower tension level as provided by the lower rate of air evacuation from that chamber.

The drawings

In the several figures of the drawings like reference numerals identify like elements, and in the drawings:

FIGURE 5 is a perspective illustration of a vacuum unit found useful in a preferred embodiment of the inventive control system;

FIGURE 6 is a partial sectional showing, taken generally along the line 6—6 in FIGURE 5, depicting the interrelationship of the different components of the vacuum unit;

FIGURE 7 is a perspective illustration of one component of the vacuum unit shown in FIGURE 5;

FIGURES 8 and 9 are perspective illustrations of other sensing units found useful with the invention; and FIGURE 10 is an illustrative showing of another embodiment of the invention.

General description of the invention

The control system of this invention is useful in connection with a web displacement system such as that in which a paper web is displaced through an electrostatic printing system. As the description proceeds those skilled in the art will appreciate the widespread applicability not only of the underlying principles of the invention but also of the various structural arrangements disclosed and claimed herein for accomplishing the ends of the invention.

Figure 1:
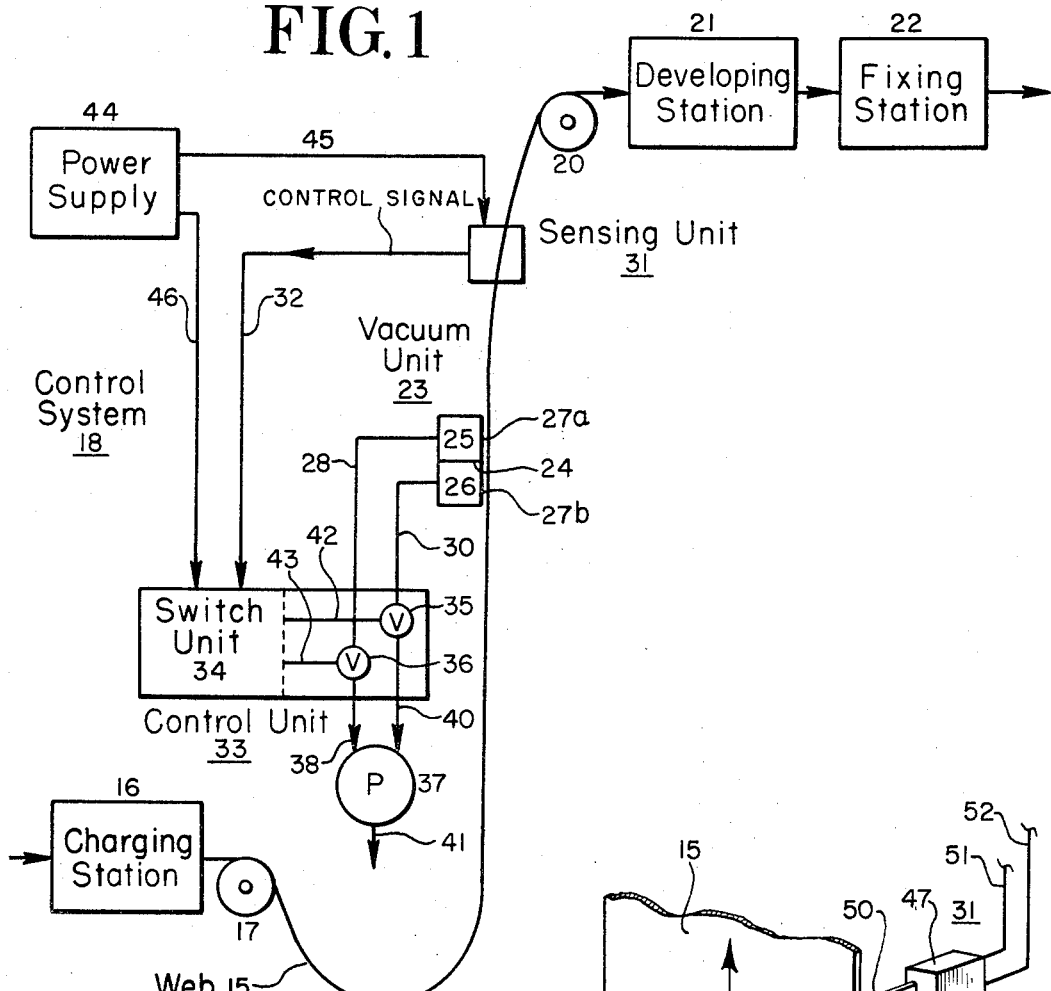
FIGURE 1 is a block diagram of a web displacement system utilizing the control system of this invention.

FIGURE 1 illustrates generally the travel of a web 15 through a portion of an electrostatic printing system in which the web is initially selectively charged at a charging station 16 to represent information on the web. The charged web passes over a guide roller 17, downwardly and then up as shown. The lateral alignment of the web 15 is regulated by control system 18 of this invention. After correction for any lateral misadjustment, the charged web passes over another guide roller 20, through a developing station 21 where opaque particles are attracted by or sprayed onto the charged areas to provide a visible record of the information, and then through a fixing station 22 where the particles are affixed (if necessary) to the web.

Control system 18 includes a vacuum unit 23 having one surface positioned adjacent the web path. This surface includes a foraminous area extending over at least a portion of the surface. Side and rear wall portions of the vacuum unit cooperate with the foraminous area to define a hollow interior space, and a divider wall 24 within the unit separates the interior into at least two chambers 25 and 26. The foraminous area can be considered as having a first segment 27a in communication with the chamber 25, and having another segment 27b which communicates through its apertures with the other chamber 26. Air can be removed at a given rate from chamber 25 through line 28, shown connected to the rear of chamber 25, and a similar line 30 is connected to permit air evacuation from the other chamber 26. It is understood that although both the chambers 25, 26 and their cooperating foraminous segments 27a, 27b are shown as positioned longitudinally along the web, this is only done to facilitate a general explanation. In practice these two chambers and their cooperating foraminous segments are disposed laterally across the web.

A sensing unit 31 is positioned to sense any lateral movement of the web with respect to the predetermined web path. Unit 31 passes a control signal denoting the direction of lateral deviation from the predetermined path over a line 32 to control unit 33, which includes both a switch unit 34 and a pair of control valves 35, 36. A pump 37 is connected so that upon energization it evacuates air over line 38 from the output side of valve 36 and also evacuates air from the line 40 connected to valve 35. Pump 37 discharges this air to the atmosphere through line 41. The switch unit 34 is connected over line 42 to regulate the opening and closing of valve 35 and is connected over line 43 to similarly regulate the other valve 36. Energy is provided by a power supply 44 over line 45 to sensing unit 31 and over line 46 to control unit 33. This power supply may be a rectifier arrangement coupled to a conventional alternating energy supply (not shown), and pump 37 likewise can be energized from a conventional electrical connection. The precise connections for energizing these arrangements are not significant to an understanding of the present invention.

Figure 2:
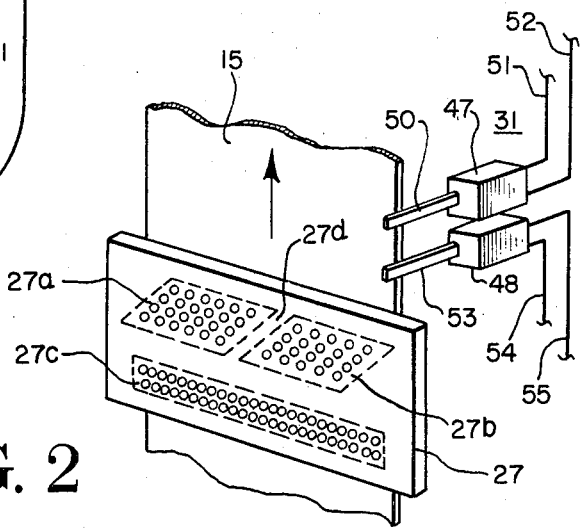
FIGURE 2 is a perspective showing, useful in understanding travel of the web both with respect to the foraminous segments on the one surface of the vacuum unit, and with respect to the sensing unit which provides the control signal indicating any lateral web deviation.

FIGURE 2 shows generally the disposition of web 15 relative to the foraminous area on one surface of the vacuum unit and also includes a general arrangement of sensing unit 31. Plate 27 of the vacuum unit defines three apertured or foraminous segments 27a, 27b and 27c as outlined by the broken lines. It is noted that solid portion 27d, between the foraminous segments 27a and 27b, extends at an angle relative to the longitudinal travel of web 15. Thus looking laterally across the web there is some overlap between segments 27a, 27b. This overlap aids in maintaining some tension on the web in the center portion even though the rates of air evacuation from the different chambers is unbalanced to vary the tension levels along the marginal portions of the web. The addition of a third segment 27c centrally positioned in the plate 27 contributes to the effective prevention of wrinkling of the web in the center, especially when a paper web is being displaced at a high speed.

Sensing unit 31 can include a simple pair of microswitches such as the illustrated switches 47 and 48. Switch 47 of the sensing unit includes a mechanical actuator 50 positioned to engage the edge of web 15. The actuator is spring biased so if the web is displaced to the left of its predetermined longitudinal path, the electrical circuit between output conductors 51, 52 will be interrupted. That is, a D-C current path is provided through a contact within the body of switch 47 to complete a D-C circuit between conductors 51 and 52 when web 15 is in its proper path, and this current path is interrupted when web 15 is displaced in the left. In an analogous manner the other switch 48 comprises a mechanical actuator 53 also positioned to lightly engage the marginal portion of the web and, when the web is displaced to the right from its desired longitudinal path, the previously closed circuit between conductors 54, 55 is opened to indicate this lateral deviation. Other forms of sensing arrangements can be utilized, as will be described hereinafter, but the simple showing of FIGURE 2 is useful considering the general control system shown in FIGURE 3.

Detailed description of the invention

Figure 3:
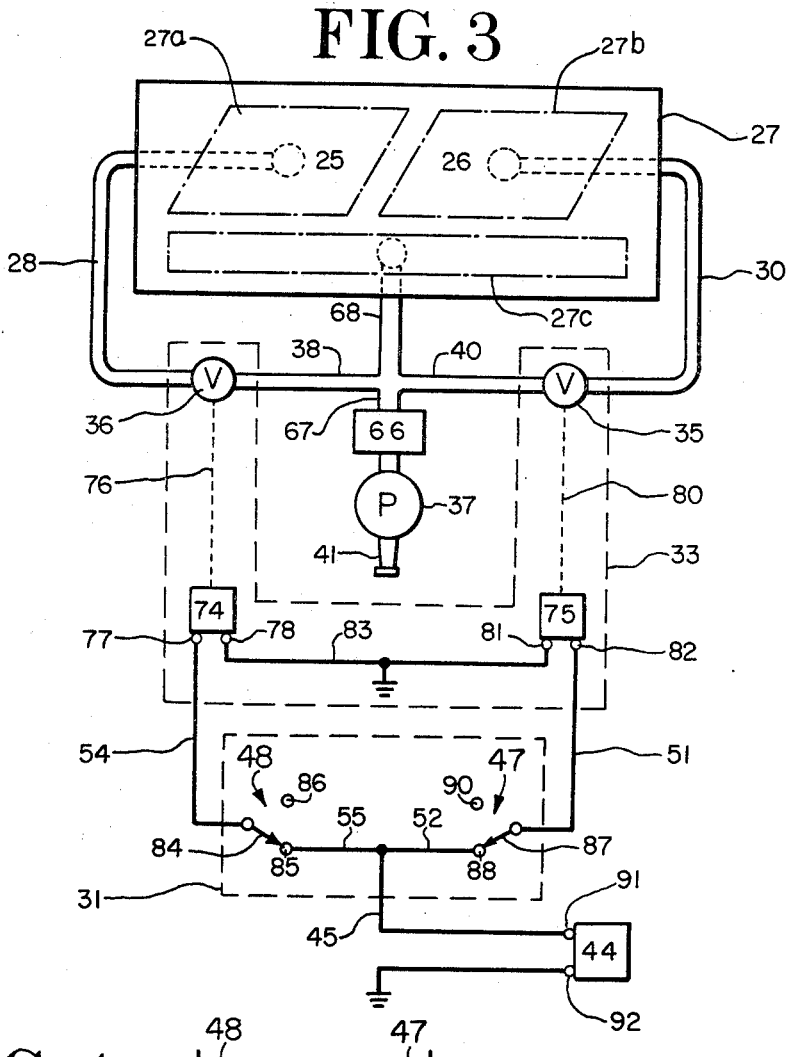
FIGURE 3 is a block diagram, partly in schematic form, illustrating generally the control system of this invention.

As shown in FIGURE 3 pump 37 is connected through an air filter box 66 to a common conduit section 67, which is coupled to the three separate conduits 28, 30 and 68. Conduit 68 is coupled with a third chamber 71 which extends transversely of substantial portions of both the web tension regulating chambers 25 and 26 in the vacuum unit. Pump 37 withdraws air from chamber 25 through the entrance aperture of conduit 28, the conduit itself, valve 36 (when open), conduits 38, 67, filter box 66, pump 37 and conduit 41 to the atmosphere. Similarly air is exhausted from chamber 26 through the entrance of conduit 30, this conduit itself, valve 35 (when open), conduits 40, 67, filter box 66 the pump, and is discharged through conduit 41 to the atmosphere.

Switching arrangement 34, shown generally in control unit 33, in this embodiment comprises a pair of solenoids 74 and 75. Solenoid 74 includes an actuator arm 76, which can be a portion (or an extension) of its armature, and a pair of input terminals 77, 78 for receiving input signals to extend and retract actuator arm 76 and correspondingly open and close valve 36. Similarly solenoid 75 includes an actuator arm or armature 80 connected to operate valve 35 responsive to the input signals received at its input terminals 81, 82. Terminal 78 of solenoid 74 is connected over a common conductor 83 to terminal 81 of solenoid 75, and conductor 83 is also connected to a plane of reference potential, commonly designated ground.

The other terminal 77 of solenoid 74 is coupled over conductor 54 to the movable contact 84 of switch 48. Contact 84 is shown engaging fixed contact 85, and is displaceable to engage the unconnected fixed contact 86 as web 15 moves to the right (FIG. 2) to interrupt the connection between conductors 54, 55. In an analogous manner the other contact 82 of solenoid 75 is coupled over conductor 51 to movable contact 87 of switch 47. Movable contact 87 is illustrated engaging fixed contact 88 and is displaceable to engage the blank or unconnected fixed contact 90 of switch 47 as web 15 is displaced to the left (FIG. 2) to interrupt the connection between conductors 51 and 52.

Power supply 44 provides an energizing potential difference between its output terminals 91 and 92. Terminal 91 is coupled over conductor 45 to the common connection between conductors 52 and 55 in the sensing unit 31. Terminal 92 is grounded, or in effect coupled to the common conductor 83 so that the energizing potential difference is applied to the input terminals of each solenoid when switches 47 and 48 are in the positions shown in FIGURE 3.

Operation of the invention

When a web displacement arrangement utilizing the control system 18 of this invention is constructed, as shown generally in FIGURE 1, the associated drive components (not shown) are energized to feed the web 15 from guide roller 17 through control system 18 and over the other guide roller 20 to the other portions of the web drive arrangement. Power supply 44 is energized to provide an energizing potential difference as already explained, and pump 37 is also energized to exhaust air to the atmosphere through conduit 41 and thus draw a vacuum through conduits 38 and 40.

Figure 4A:
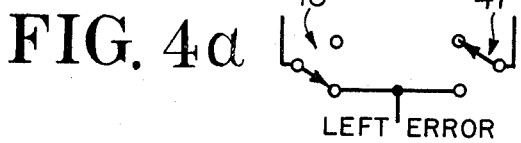
FIGURES 4a, 4b and 4c are schematic representations of switching components in one embodiment of the lateral web deviation sensing means.
Figure 4B:
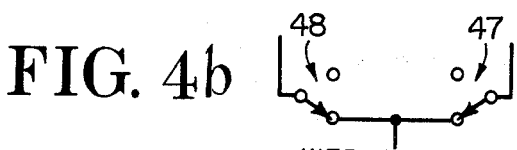
Figure 4C:

Assuming initially that there is no lateral misalignment of web 15 with respect to the face plate of vacuum unit 23, switches 47, 48 (FIG. 2) will each maintain their contact sets in the closed position as shown in FIGURE 4b to complete the circuits from terminal 91 of power supply 44 through these switches to the solenoids 74 and 75, actuating these solenoids and opening valves 35 and 36. Thus pump 37 is at this time effective to evacuate air from the guide chambers 25, 26 and from the wrinkle-preventing central chamber 71 of the vacuum unit.

Assuming now that web 15 is inadvertently displaced to the left of the predetermined web path, switch 47 opens as shown in FIGURE 4a to interrupt the connection between conductors 51 and 52, interrupting the energizing circuit for solenoid 75 which releases and closes valve 35. Thus air is not evacuated from guide chamber 26 through conduit 30, and the tension level along the right side of the web, between the web and segment 27b, is reduced relative to the level of tension mantained between segment 27a and the left portion of the travelling web 15. Because of the unbalance in the tension levels the web is returned toward the right, toward the area of lower tension, until the lateral misalignment is corrected.

Similarly, if an unwanted lateral displacement of the web 15 occurs toward the right side, switch 48 releases and interrupts the connection between conductors 54, 55, solenoid 74 releases and valve 36 is closed, reducing the rate of air evacuation from chamber 25 and thus reducing the level of tension between foraminous segment 27a and the left side of web 15. Accordingly the web is displaced toward the left, toward the area of lower tension, and the misalignment is corrected. When the web is again on the desired path switch 48 will again be closed and valve 36 will be opened to complete the path for air evacuation from chamber 25.

It is emphasized that, notwithstanding variations in the rates of air evacuation from the guide chambers 25 and 26, a constant rate of air evacuation is always maintained from the wrinkle-preventing central chamber 71. While this arrangement is presently believed to be the best mode contemplated for practicing the invention, especially when a paper web is displaced at a high longitudinal rate, chamber 71 is not requisite to the fundamental structure and operation of the inventive control system.

Vacuum unit 23

As depicted in FIGURE 5, vacuum unit 23 is comprised of three separate plates 27, 95 and 96 which can be bolted (not shown), soldered or otherwise secured together to maintain the assembly in the illustrated form. The face of plate 27 farther from the center of the assembly is that surface of the vacuum unit which is disposed adjacent the web as it travels along the predetermined path. Three foraminous segments 27a, 27b and 27c are provided over an area of plate 27. As previously explained only the guide segments 27a and 27b are requisite to the construction and operation of the invention, and the third foraminous segment 27c is a refinement of particular utility when a paper web is displaced at high speed.

FIGURE 6 shows a portion of the vacuum unit in a cut-away illustration. The foramina 97 which comprise the plurality of apertures in segment 27a each have an enlarged throat area near the outer surface of the plate and a smaller channel which completes the communication with chamber 26. The second plate or center spacer 95, as better shown in FIGURE 7, is machined to define three separate chamber portions 25a, 26a and 71a. Solid portion 95a can be considered as a divider means which effectively separates the hollow interior of the vacuum unit into the two separate chambers 25 and 26. Backing plate 96, as best shown in FIGURE 6, is generally solid and includes three threaded ports such as the port 96a for intercoupling with the respective conduits such as 30 to facilitate the evacuation of air through the foramina 97, chamber 26, port 96a and conduit 30.

Other embodiments

FIGURE 8 depicts another arrangement of sensing unit 31 in which the switches 47, 48 of FIGURE 2 are replaced by a pair of radiation-emitting and sensing asssemblies 100 and 101. As there shown in the upper assembly 100, a lamp 102 is energized to pass radiation toward the web 15. When the web is displaced to the left, a portion of the radiation passes to the right of the web edge and impinges upon a mask 103 which defines a small slit 104 in its center. The slit is disposed centrally between lamp 102 and a photocell 105 having an active portion which produces an electrical output signal on conductors 151, 152 responsive to the impingement of radiation on the photocell received through the slit 104. If this radiation is ordinary visible light from a standard bulb, photocell 105 is also a standard type. If infrared or other radiation is produced for passage through the slit to impinge on the photocell, manifestly the photocell material must be selected to provide an output signal for the particular wavelength of the energy received. Similarly the other assembly 101 includes a lamp 106 disposed to pass energy beyond the edge of web 15 to impinge on another mask 107 which defines a small slit 108 in its central portion. The lamp-slit-photocell axis from lamp 106 through slit 108 to photocell 110 is such that energy passing from the lamp through slit 108 impinges on the active area of the photocell and produces an electrical output signal on conductors 154, 155. It should be noted that although switch assembly 100 is positioned to provide a signal indicative of lateral displacement of web 15 to the left, this will be effected by passage from a first condition where the right margin of web 15 blocks any radiation from impinging on the slit 104 and producing no output signals on conductors 151, 152, to a left-deviation condition in which the margin of the web has been displaced so that radiation from lamp 102 passes through slit 104 to strike photocell 105 and produce a signal on conductors 151, 152. This is a different electrical effect than was produced with switch 47. This can be accommodated, by way of example, in the solenoid and its actuator arm by changing the linkage connections between its solenoid and its associated valve so that the opposite movement of the valve is produced for a given operation of its associated solenoid. Those skilled in the art will appreciate that, given one or more signals denoting the correct alignment or misalignment of the web, a multitude of control arrangements can be utilized to maintain lateral web alignment.

Instead of two separate signals signifying the lateral web misalignment a single signal can be provided as shown in FIGURE 9. By providing a mask 111 which is apertured to define an elongated slit 112 in its interior, and supporting the mask so that the right edge of the web 15 normally is positioned centrally of the slit 112, radiation from an energized source 113 will pass through that portion of slit 112 not blocked by the web and impinge on a portion of the elongated face of a photocell 114 to provide a control signal on its output conductors 115, 116. When the web 15 is displaced laterally to the left, all of slit 112 is exposed and radiation passes through the entire slit to provide a maximum level control signal on conductors 115, 116. When the web 15 is displaced to the right of its predetermined position sufficiently to block all of slit 112, the amplitude of the control signal on conductors 115, 116 goes to zero. For lesser amounts of lateral deviation from the predetermined web path, there is a corresponding lesser deviation in the amplitude of the control signal from a reference level produced when the web is on the desired path. One embodiment of a control system suitable for use with this proportional or modulating control signal is depicted in FIGURE 10.

As there shown the proportional control signal provided on conductors 115, 116 is passed to a solenoid 117 connected so that displacement of its armature and/or its extended actuator arm 118 is a function of the amplitude of the received control signal. Movement of actuator arm 118 determines the setting of a proportional control valve 120 shown connected so that, as the valve is opened wider, more air can be passed from conduit 121 through the valve body, conduit 122, pump 37 and discharge conduit 41 to the atmosphere. A cylinder assembly 123 defines an interior bore 124 connected with conduit 121 so that the pressure established by evacuation of air through this conduit is applied to the face of piston 125. A bias spring 126 is connected between the other face of piston 125 and an interior wall of the cylinder to oppose the force produced by pump 37 and return the piston toward a reference position. A rod 127 connects the piston face 125 with one leg of the right angle member 128, the other leg of which is terminated in a threaded portion received in a correspondingly tapped bore of a slide 130. In this embodiment slide 130 functions as the divider means which separates the hollow interior of the vacuum unit into at least two chambers 131 and 132 (analogous to the chambers 25, 26 of the preferred embodiment), with each chamber in communication with a segment of the foraminous area 133 of this vacuum unit 134.

A bottom plate 135 is affixed by means not illustrated to the under side of vacuum unit 134, and plate 135 defines a central channel (not shown) to guide the piece 129 affixed to the arm of member 128 as divider means 130 is displaced laterally within the unit. Plate 135 also defines apertures through which the conduits 136 and 137 are respectively connected to the chambers 131 and 132. A pump 138 is connected between these conduits and a discharge conduit 140 to draw air through the foramina 141 in face plate 133, through the chambers 131 and 132, conduits 136 and 137, pump 138 and conduit 140 to the atmosphere. If desired the same pump 37 which is utilized in this embodiment to regulate movement of piston 125 within unit 123 can also be connected to evacuate air from conduits 136 and 137. A retainer plate 142 is affixed to the arm portion of member 128 to cover the channel within bottom plate 135 and prevent air from leaking into the vacuum chambers 131, 132.

Although the system depicted in FIGURE 10 is a proportional one for operating over a continuous range, those skilled in the art will appreciate that an on-off type control system can also be utilized with sensing means such as that shown in FIGURE 8 or the microswitches depicted in FIGURE 2. Other admixtures of the various components depicted in the drawings, and their equivalent structures as generally known and available, will doubtless be suggested to those skilled in the art.

Although only particular embodiments of the present invention have been described and illustrated it is manifest that various modifications and alterations may be made therein.

What is claimed is:

1. In a drive arrangement for longitudinally displacing a web along a predetermined path, a control system for maintaining lateral alignment of the web, comprising:
   a vacuum unit having one surface disposed adjacent the predetermined web path and said surface including a foraminous area extending over at least a portion thereof, wall portions cooperating with said one surface to define a hollow interior behind said foraminous area, and divider means fixed in position to separate said hollow interior into at least two chambers, each chamber being in communication with a segment of foraminous area;
   means connected to evacuate air from said chambers and thus provide tension between the web and the foraminous segments;
   means positioned to sense lateral movement of the web relative to said predetermined path and to provide a control signal denoting the direction of lateral deviation from said predetermined path; and
   a control unit connected for operation in response to receipt of said control signal to vary the tension level between the web and one of said foraminous segments relative to the tension level between the web and the other of said foraminous segments comprising a first valve coupled between one of said chambers and the air evacuation means, a second valve coupled between the other of said chambers and the air evacuation means, and switching means connected to open and close the first and second valves in response to receipt of said control signal, regulating the relative rates of air evacuation to adjust the tension levels and correct for lateral web misalignment, said web tending to be generally laterally displaced toward the lower tension level to correct lateral alignment of the web along its predetermined path;
   in which the means for providing the control signal comprises a single switching assembly operative to provide a gradually varying control signal as the web is gradually displaced laterally in either direction from the predetermined web path.

2. In a drive arrangement for longitudinally displacing a web along a predetermined path, a control system for maintaining lateral alignment of the web, comprising:
   a vacuum unit having one surface disposed adjacent the predetermined web path and said surface including a foraminous area extending over at least a portion thereof, wall portions cooperating with said one surface to define a hollow interior behind said foraminous area, and divider means fixed in position to separate said hollow interior into at least two chambers, each chamber being in communication with a segment of said foraminous area;
   means connected to evacuate air from said chambers and thus provide tension between the web and the foraminous segments;
   means positioned to sense lateral movement of the web relative to said predetermined path and to provide a control signal denoting the direction of lateral deviation from said predetermined path; and
   a control unit connected for operation in response to receipt of said control signal to vary the tension level between the web and one of said foraminous segments relative to the tension level between the web and the other of said foraminous segments, the tension levels being adjusted by varying the rate of air evacuation from one of said chambers relative to the rate of air evacuation from the other of said chambers to correct for lateral web misalignment, said web tending to be generally laterally displaced toward the lower tension level to correct lateral alignment of the web along its predetermined path;
   wherein the vacuum unit comprises a first plate which defines the foraminous area over at least a portion of its surface, an intermediate plate defining portions of said chambers, and a backing plate including connection areas through which the air can be evacuated to provide the requisite tension levels.

3. In a drive arrangement for longitudinally displacing a web along a predetermined path, a control system for maintaining lateral alignment of the web, comprising:
   a vacuum unit having one surface disposed adjacent the predetermined web path and said surface including a foraminous area extending over at least a portion thereof, wall portions cooperating with said one surface to define a hollow interior behind said foraminous area, and divider means positioned to separate said hollow interior into at least two chambers, each chamber being in communication with a segment of said foraminous area;
   means connected to evacuate air from said chambers and thus provide tension between the web and the foraminous segments;
   means positioned to sense lateral movement of the web relative to said predetermined path and to provide a control signal denoting the direction of lateral deviation from said predetermined path; and
a control unit connected for operation in response to receipt of said control signal to vary the tension level between the web and one of said foraminous segments relative to the tension level between the web and the other of said foraminous segments, said web tending to be generally laterally displaced toward the lower tension level to correct lateral alignment of the web along its predetermined path;
in which said divider means comprises a slide member disposed for transverse movement within the hollow interior of the vacuum unit to effect variations in the relative dimensions of said two chambers, thus effecting corresponding variations in the tension levels between the web and the segments of the foraminous area.

4. In a drive arrangement for longitudinally displacing a web along a predetermined path, a control system for maintaining lateral alignment of the web, comprising:
a vacuum unit having one surface disposed adjacent the predetermined web path and said surface including a foraminous area extending over at least a portion thereof, wall portions cooperating with said one surface to define a hollow interior behind said foraminous area, and divider means positioned to separate said hollow interior into at least two chambers, each chamber being in communication with a segment of said foraminous area;
means connected to evacuate air from said chambers and thus provide tension between the web and the foraminous segments;
means positioned to sense lateral movement of the web relative to said predetermined path and to provide a control signal denoting the direction of lateral deviation from said predetermined path; and
a control unit connected for operation in response to receipt of said control signal to vary the tension level between the web and one of said foraminous segments relative to the tension level between the web and the other of said foraminous segments, said web tending to be generally laterally displaced toward the lower tension level to correct lateral alignment of the web along its predetermined path;
in which the foraminous area of said vacuum unit includes a third segment, and the vacuum unit further comprises a third chamber in communication with said third segment of the foraminous area, means including the air evacuation means connected to evacuate air from said third chamber, said third segment being centrally positioned to obviate wrinking of the web during correction of the lateral web misalignment by the control system.

5. In a drive arrangement for longitudinally displacing a web along a predetermined path, a control system for maintaining lateral alignment of the web, comprising:
a vacuum unit including a face plate disposed laterally across the web path, said face plate defining a foraminous area over at least a portion of its surface, wall portions coperating with said face plate to define a hollow interior in communication with said foraminous area, and a divider separating the hollow interior into at least two chambers, so that each chamber is in communication with a segment of the foraminous area;
a pump and fluid conduits connected to evacuate air from both said chambers to provide tension between the web and the respective foraminous segments in communication with the chambers;
a sensing unit positioned adjacent the web and operative to provide a control signal indicative of the direction of lateral deviation of the web from its predetermined path; and
a control unit connected for operation in response to receipt of said control signal to vary the tension level between the web and one segment of the foraminous area relative to the tension level between the web and the other segment of the foraminous area, such that the web is displaced laterally in the direction of the lower tension level and the lateral web misalignment is corrected;
in which said vacuum unit includes a second plate abutting said face plate and having a divider portion and wall portions, and a backing plate abutting said second plate and including connection areas through which air can be evacuated at controlled rates to provide the requisite tension levels between the web and the foraminous segments.

6. A control system as claimed in claim 5 in which said control unit comprises a first valve coupled between one of said chambers and the pump, a second valve coupled between the other of said chambers and the pump, and switching means connected to open and close the first and second valves in response to receipt of said control signal, thus regulating the relative rates of air evacuation to adjust the relative tension levels and correct for lateral web misalignment.

7. A control system as claimed in claim 6 in which the sensing unit includes a pair of switching arrangements, each of the on-off type, each switching arrangement including a radiating means disposed on one side of the web adjacent one web edge, a mask defining an aperture therein and disposed on the other side of the web adjacent the same web edge, and a radiation-sensing means disposed on the side of the mask farther from said radiating means in a position to provide an electrical output signal when the lateral web alignment is such that the edge of the web does not block radiation emitted from the radiating means from passing through the mask aperture to impinge on the radiation-sensing means.

8. A control system as claimed in claim 6 in which the sensing unit includes a single switching arrangement, comprising a radiating unit on one side of the web adjacent one web edge, a mask defining an extended aperture and positioned on the other side of the web adjacent the same web edge, and a radiation-sensing unit with an extended radiation-sensing area disposed such that radiation passing from the radiating unit through the extended mask aperture impinges on said extended radiation-sensing area, such that lateral displacement of the web edge exposes a portion of the mask aperture and allows a corresponding amount of radiation to pass to the sensing unit, thus providing a continuously varying control signal which is a function of the instantaneous lateral web deviation.

9. In a drive arrangement for longitudinally displacing a web along a predetermined path, a control system for maintaining lateral alignment of the web, comprising:
a vacuum unit including a face plate disposed laterally across the web path, said face plate defining a foraminous area over at least a portion of its surface, wall portions cooperating with said face plate to define a hollow interior in communication with said foraminous area, and a divider separating the hollow interior into at least two chambers, so that each chamber is in communication with a segment of the foraminous area;
a pump and fluid conduits connected to evacuate air from both said chambers to provide tension between the web and the respective foraminous segments in communication with the chambers;
a sensing unit positioned adjacent the web and operative to provide a control signal indicative of the direction of lateral deviation of the web from its predetermined path; and
a control unit connected for operation in response to receipt of said control signal to vary the tension level between the web and one segment of the foraminous area relative to the tension level between the web and the other segment of the foraminous area, such that the web is displaced laterally in the direction of the lower tension level and the lateral web misalignment is corrected;

in which said divider includes a slide member disposed within the hollow interior of the vacuum unit for transverse movement regulated by said control signal, to correspondingly regulate the relative dimensions of said two chambers in the vacuum unit and effect a corresponding variation in the relative tension levels between the web and the segments of the foraminous area.

10. In a drive arrangement for longitudinally displacing a web along a predetermined path, a control system for maintaining lateral alignment of the web, comprising:

a vacuum unit including a face plate disposed laterally across the web path, said face plate defining a foraminous area over at least a portion of its surface, wall portions cooperating with said face plate to define a hollow interior in communication with said foraminous area, and a divider separating the hollow interior into at least two chambers, so that each chamber is in communication with a segment of the foraminous area;

a pump and fluid conduits connected to evacuate air from both said chambers to provide tension between the web and the respective foraminous segments in communication with the chambers;

a sensing unit positioned adjacent the web and operative to provide a control signal indicative of the direction of lateral deviation of the web from its predetermined path; and a control unit connected for operation in response to receipt of said control signal to vary the tension level between the web and one segment of the foraminous area relative to the tension level between the web and the other segment of the foraminous area, such that the web is displaced laterally in the direction of the lower tension level and the lateral web misalignment is corrected;

in which the foraminous area of the face plate includes a third segment, and the vacuum unit further comprises a third chamber in communication with said third segment of the foraminous area, means including said pump connected to evacuate air from said third chamber, said third segment being centrally positioned to obviate wrinkling of the web during correction of the lateral web misalignment by the control system.

References Cited

FOREIGN PATENTS 811,574    4/1959    Great Britain.

M. HENSON WOOD, Jr., Primary Examiner

U.S. Cl. X.R.

226—39, 95